(No Model.)
A. WIDMAYER.
DUMPING WAGON.
No. 532,301. Patented Jan. 8, 1895.
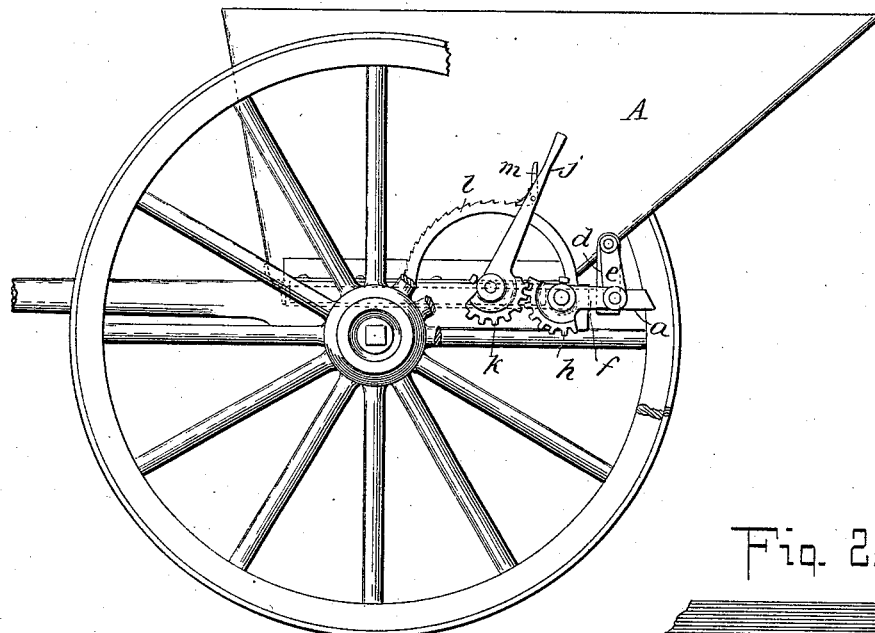
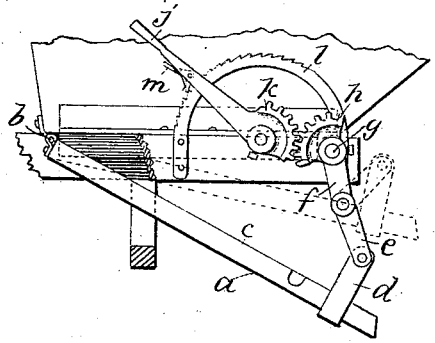
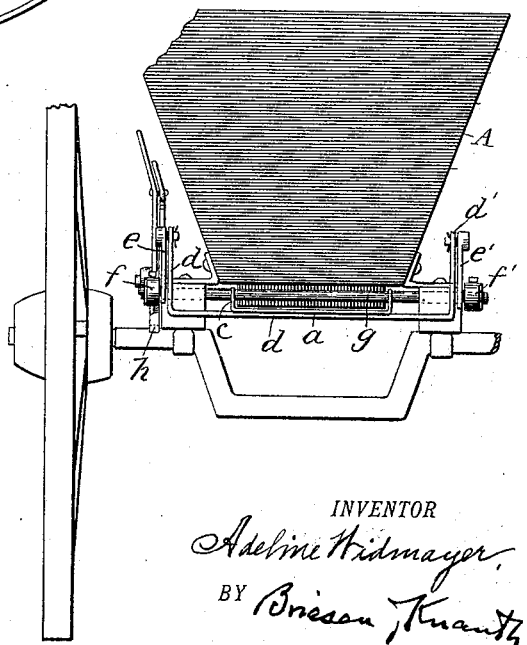
WITNESSES:
INVENTOR
Adeline Widmayer,
BY Briesen, Knauth
ATTORNEYS

UNITED STATES PATENT OFFICE.

ADELINE WIDMAYER, OF NEW YORK, N. Y.

DUMPING-WAGON.

SPECIFICATION forming part of Letters Patent No. 532,301, dated January 8, 1895.

Application filed April 25, 1894. Serial No. 508,933. (No model.)

*To all whom it may concern:*

Be it known that I, ADELINE WIDMAYER, a resident of the city, county, and State of New York, have invented certain new and useful Improvements in Dumping-Wagons, of which the following is a specification.

My invention relates to dumping wagons, and has for its object to produce a wagon which can be emptied of its contents without tilting the same as is now the general practice.

To this end my invention consists in providing a wagon of any ordinary or preferred construction with a movable bottom which may also serve as a chute for the material to be dumped from the wagon.

I attain the object of my said invention by means of the mechanism illustrated in the accompanying drawings, wherein—

Figure 1 is a side view partly broken away of a cart or wagon showing one form of my invention applied thereto. Fig. 2 is a broken away rear view of the same; and Fig. 3 is a fragmentary detail view showing the operating parts in a position different from that of Fig. 1, and showing also in dotted lines the operating mechanism in a position intermediate of the position shown in Fig. 1 and in full lines in Fig. 3.

In carts as hitherto constructed it has been the ordinary practice to pivot the body and to hold the same normally in a horizontal position. When, however, it was desired to remove the contents of the cart it has been the general practice heretofore to remove the means for holding the cart-body in a horizontal position and to tilt or tip the cart to allow its contents to run out at one end. This required considerable manipulation of the cart-body and a great expenditure of energy on the part of the driver to dump the cart. Now, by my invention I obviate all these difficulties by providing the cart with a movable bottom, which bottom may be tilted or tipped to allow the contents of the cart to be discharged. I also provide the cart with suitable operating mechanism for tilting or tipping the bottom.

In the drawings, A is a suitable cart-body preferably of the form shown. This cart-body is provided at or near its lowermost portion with a swinging bottom *a*. This bottom may be hinged or pivoted as by a pivot *b* or otherwise hung so as to swing. This bottom *a* preferably has turned-up edges *c* which serve to guide the contents of the cart when they are discharged, the bottom serving as a conveyer for the contents of the cart when the same is being emptied. The free end of this combined chute and bottom is hung to the cart-body by means of suitable links or arms such as *d*, *e*, *f*, which are pivoted one to the other, the link *f* being rigidly attached to a rock-shaft *g* carried upon some fixed portion of the frame of the cart.

Rigidly connected to the link *f* or integral therewith is a segmental gear *h*. Pivoted also upon the frame of the cart is a hand lever *j* having rigidly secured thereto or made integral therewith a segmental gear *k* which meshes with the gear *h*.

A toothed arc *l* or other suitable holding device may be provided with which a suitable catch as *m* carried by the lever *j* is adapted to engage. This device for tilting the bottom is preferably carried upon one side of the cart, the rock-shaft *g* which extends entirely across the cart-body being provided at its other end with a link *f'* to which is connected a link *e'* connected in its turn to a link *d'* which is connected with the swinging bottom or made integral therewith. These links may be in all respects similar to the links *f*, *e*, *d*.

Instead of employing the pivoted bottom shown, any other suitable form of swinging bottom may be employed. I would likewise have it understood that I do not limit myself to the precise means for moving the swinging bottom, as other and equivalent means may be employed; nor do I wish to be understood as limiting myself to a bottom located at the lowermost part of the cart-body, nor indeed specifically to a bottom *per se*, as a side or portion of a side of the cart-body may be arranged to swing and to serve as a chute to empty the cart. So, therefore, it is in the light of this explanation that I desire the terms "bottom" and "operating mechanism" to be read in the claims.

When the parts are in the position shown in Fig. 1 and it is desired to remove the contents from the cart, the catch *m* is released from the arch *l* and the lever is swung into the position shown in Fig. 3, the gears working one within the other, and all the parts will take up the position shown in Fig. 3. When, however, it is desired to return the parts to their initial position the bottom is raised by hand or other suitable means and the lever is rocked into its former position, when the parts will again resume the normal position shown in Fig. 1, passing through the intermediate position shown in dotted lines in Fig. 3.

What I claim, and desire to secure by Letters Patent, is—

1. In a dumping wagon or cart, the combination of a body, an opening in the lowermost part thereof, a swinging bottom therefor pivoted at one end to the body, a lever secured to a segmental gear, a rock shaft secured to a segmental gear, said segmental gears being arranged to mesh together, an arm rigid on the rock shaft, and an arm rigid on the free end of the swinging bottom, and a link connecting said arms, substantially as described.

2. In a dumping wagon or cart, the combination of a body, an opening in the lowermost part thereof, a swinging bottom therefor pivoted at one end to the body and provided with turned up edges, a lever secured to a segmental gear, a rock shaft secured to a segmental gear, said segmental gears being arranged to mesh together, an arm on each side of the body rigid on the rock shaft, an arm on each side of the body rigid on the free end of the swinging bottom, and a link connecting the arms on each side, all arranged so that the swinging bottom may be lowered and raised and securely held in each position, substantially as described.

ADELINE WIDMAYER.

Witnesses:
HARRY M. TURK,
GEO. E. MOESEE.